(No Model.) 2 Sheets—Sheet 1.
O. D. WOODRUFF & L. T. SNOW.
MEAT CUTTER.
No. 484,987. Patented Oct. 25, 1892.
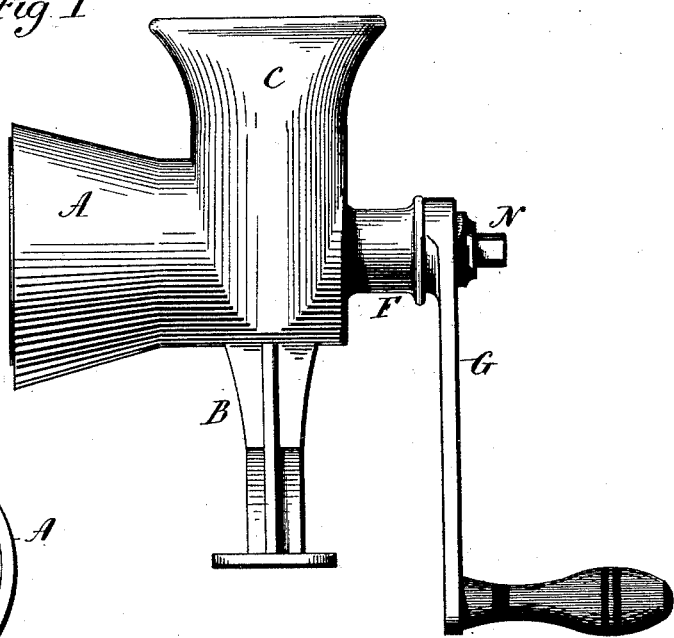
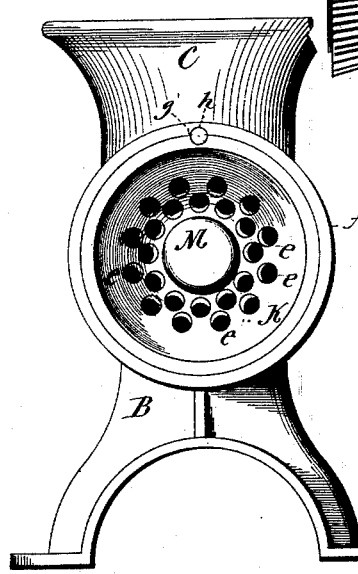
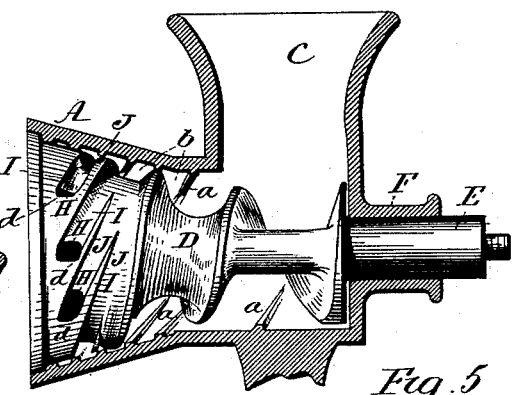
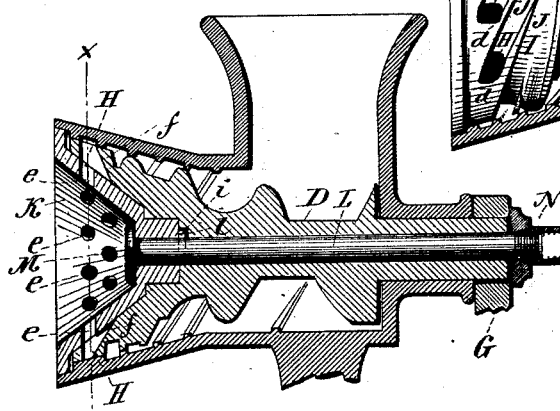

(No Model.) 2 Sheets—Sheet 2.
O. D. WOODRUFF & L. T. SNOW.
MEAT CUTTER.
No. 484,987. Patented Oct. 25, 1892.
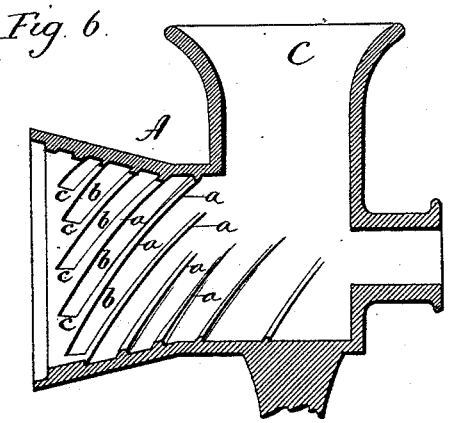
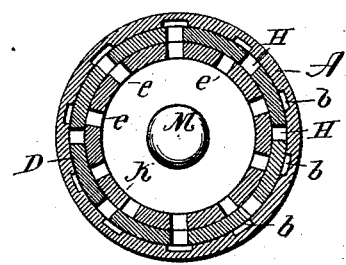
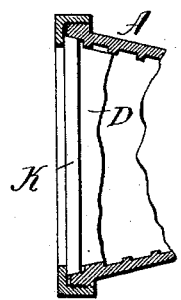
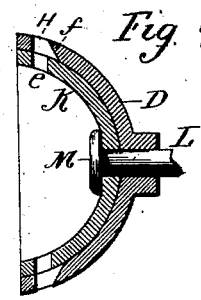
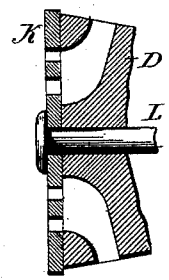
Witnesses
Oliver D. Woodruff
Levi T. Snow
Inventors

UNITED STATES PATENT OFFICE.

OLIVER D. WOODRUFF, OF SOUTHINGTON, AND LEVI T. SNOW, OF NEW HAVEN, CONNECTICUT.

MEAT-CUTTER.

SPECIFICATION forming part of Letters Patent No. 484,987, dated October 25, 1892.

Application filed March 28, 1892. Serial No. 426,770. (No model.)

*To all whom it may concern:*

Be it known that we, OLIVER D. WOODRUFF, of Southington, county of Hartford, and LEVI T. SNOW, of New Haven, in the county of New Haven, State of Connecticut, have invented a new Improvement in Meat-Cutters; and we do hereby declare the following, when taken in connection with accompanying drawings and the letters of reference marked thereon, to be a full, clear, and exact description of the same, and which said drawings constitute part of this specification, and represent, in—

Figure 1, a side view of the machine complete; Fig. 2, a delivery-end view of the same; Fig. 3, a central longitudinal section through the case, showing the screw and perforated plate in side view; Fig. 4, a central longitudinal section cutting through the case, feed-screw, and perforated plate; Fig. 5, a front end view of the feed-screw detached; Fig. 6, a longitudinal central section of the case with the feed-screw and perforated plate removed; Fig. 7, a section on line $x\ x$ of Fig. 4; Figs. 8, 9, and 10, modifications.

This invention relates to an improvement in machines for hashing or mincing meat and other substances, and particularly to that class in which the machine consists of a case with a hopper at one end for the introduction of the meat, and having combined therewith a feed-screw arranged longitudinally through the case to receive the meat at the hopper and force the material forward through the case, the case provided at its delivery end with perforations through which the material will be forced, and particularly to the machines of this class in which a preliminary cutting is produced within the case before the material being operated upon reaches the perforated plate, and a final cut made upon the material at the perforated plate, the object of the invention being to produce a machine simple in construction and which may be readily adjusted and conveniently cleaned; and the invention consists in the construction and combination of parts, as hereinafter described, and particularly recited in the claims.

A represents the case, which is supported upon any suitable standard or bracket, here represented as by legs B, projecting downward from the case. At one end the case is constructed or provided with a hopper C, through which the material to be operated upon may be introduced. Extending from the hopper the case is preferably expanded so as to increase its diameter toward the other or delivery end of the case. The interior of the case is constructed with a series of spiral ribs $a\ a$, more or less in number, the inclination of the ribs being from the hopper toward the delivery end. These ribs form spiral grooves $b$ within the case, which grooves terminate abruptly near the delivery or outer end of the case and so as to form shoulders $c$, these shoulders being in substantially longitudinal planes, and as clearly seen in Fig. 6. Within the case a forcing device is applied, which is in the form of a screw D. The shank E of the screw extends through a bearing F, formed in the hopper end of the case, and, as seen in Fig. 3, the shank being adapted for the application of power thereto, here represented as by a crank G, so that the feed-screw D may be revolved within the case, the screw being concentric with the interior of the case, and so that material introduced into the case through the hopper will be received upon the blades of the screw, and under the revolution of the screw will be forced toward the delivery end of the case, as usual in this class of machines. The periphery of the blade of the screw increases in diameter according to the increase in the diameter of the case and so that the edge of the blade or spiral rib of the feed-screw will run substantially in contact with the inner surface of the case. At the outer or delivery end the feed-screw is recessed, the recess tapering—that is, expanding in diameter from the inner end outward—and so as to form a concentric chamber within that end of the feed-screw. The spiral blade of the feed-screw terminates before it reaches the end. The end of the feed-screw is of plain circular shape and fits closely within that part of the case, as represented in Fig. 3. A little back from the extreme end of the feed-screw a series of openings H are formed through from the outside of the feed-screw into the chamber within, as seen in Fig. 4, and these openings stand in the plane of the shoulders $c$, which form the termination of the grooves *b* in the case. On the periphery of this end portion of the feed-screw spiral grooves I lead from the openings H rearward into the groove formed by the blade of the feed-screw. The pitch of these grooves I is about the same as that of the blade of the feed-screw, and the grooves form corresponding spiral ribs J between them, substantially parallel with the spiral blade of the feed-screw, and so that under the revolution of the feed-screw the material being operated upon is forced along through the case, the spiral ribs of the case coacting with the spiral rib of the feed-screw, as usual in this class of machines; but approaching the end of the feed-screw the material follows the narrower grooves I of the feed-screw and the grooves *b* of the case until the openings in the feed-screw are reached when, as the farther advance of the material is resisted by the side of the openings H the material will be turned through the openings toward the interior or chamber in the end of the feed-screw, and as these openings H form the termination of the grooves I they produce a shoulder *d*, opposed to the shoulders *c* in the case and to that portion or the ribs *a* near the shoulders *c*, and the shoulders *d*, coacting with the shoulders *c* and the ribs *a*, operate as cutters to cut from the mass that portion of the material which shall have passed into the openings H and so as to entirely separate that portion of the material from the mass, and were there nothing to prevent the material so cut from the mass it would at once fall into the chamber in the end of the feed-screw and be delivered from the machine. There is also a cutting of the mass produced by means of the ribs J on the feed-screw coacting with the ribs in the interior of the case. The cutting thus produced between the feed-screw and the case is a preliminary cutting and preparatory to the final cutting of the material before it is delivered from the machine.

The supplemental or final cutting is produced by means of a cup-shaped plate K, arranged in the open end of the case, as seen in Fig. 4, the periphery of the plate of a shape corresponding to and so as to fit closely against the wall of the interior of the chamber in the end of the feed-screw, and as seen in Fig. 4. The openings H into the chamber in the feed-screw open directly upon the surface of the plate K. The plate K is perforated with numerous holes *e*, which extend from the periphery of the plate into the interior of the plate. The plate is held stationary or prevented from revolving with the feed-screw, so that the feed-screw revolves upon the plate, the openings H in the feed-screw working over perforations *e* in the cone. The result of this is that as the material passes through the openings in the feed-screw and is cut from the mass and more material advances, the material so cut passes into and through the perforations *e* in the plate, and the material so projecting into the perforations of the plate is held stationary while the feed-screw is revolved. Consequently the openings H act in conjunction with the perforations *e* of the plate as cutters, so as to again and finally cut the material. Thence the material so finally cut passes into the recess in the outside of the plate, and is thence delivered from the machine.

The supplemental cutting may be varied by making the perforations in the plate larger or smaller. Preferably the openings H through the end of the feed-screw are undercut, as represented at *f*, Fig. 4, which form recesses between the plate and the wall of the chamber in the feed-screw, so that the surface of the plate exposed to the material delivered through the openings H is greater than it would be were the openings not so undercut. This enables the number of perforations through the plate to be increased over what otherwise might be.

To hold the perforated plate in its place stationary in the case, a notch *g* is formed in its periphery and a corresponding pin *h* introduced into the case, as seen in Fig. 2, the pin being stationary, and so that the pin forms a projection of the case extending into the notch *g*, which when brought together, as seen in Fig. 2, prevent the revolution of the plate.

It is desirable to make the plate adjustable with relation to the feed-screw, so that the closeness of fit between the walls of the chamber in the feed-screw and the periphery of the plate may be varied as occasion requires. To accomplish this object the feed-screw is made tubular and with a corresponding central opening through the plate, and through this opening and plate and through the tubular feed-screw a bolt L is introduced, and so that the head M of the bolt will bear against the inside of the plate at the apex. The bolt extends through the feed-screw or arbor and is screw-threaded at its other end, and at that end a thumb-nut N is applied, adapted to bear against the head of the crank and so as to draw the plate into the chamber in the feed-screw to a greater or less extent, as occasion may require, and at the same time, the head of the crank bearing, as it does, against the outer end of the bearing F, the turning of the nut operates to draw the feed-screw more closely into the case and thereby adjust its conical periphery with relation to the corresponding interior surface of the case, so that the nut serves not only as a means for adjusting the plate with relation to the screw and the screw with relation to the plate, but also operates to secure all the parts together and so that by the removal of the nut only the parts may be separated.

To prevent disadjustment of the thumb-nut, the bolt and the thumb-nut are made to revolve with the arbor or feed-screw, while the plate remains stationary. The bolt and arbor are connected by means of a stud *i* on the bolt setting into a corresponding notch $l$ in the feed-screw. This bolt not only serves for the adjustment of the plate with relation to the chamber of the feed-screw, but also serves to hold the plate in the case against longitudinal displacement.

While preferring the adjustment and holding of the perforated plate by means of the bolt through the arbor, the plate may be otherwise held and adjusted—for illustration, as seen in Fig. 8—in which a screw-collar is applied over the outer end of the plate and onto the end of the case, so that the flange of the collar will bear against the outer end of the plate and so that by turning the collar to a greater or less extent the adjustment of the plate longitudinally may be produced, as well as the plate held in place.

While preferring to make the chamber in the end of the feed-screw and the plate of conical shape, the cup shape of the plate may be other than that of a cone. For instance, it may be hemispherical, as seen in Fig. 9, with the same result. Again, the plate instead of being cup-shaped may be flat, as seen in Fig. 10, and perforated, the openings from the grooves of the feed-screw terminating against the inner face of the perforated plate and so as to work in connection with the perforations of the flat plate, the same as do openings of the feed-screw against the surface of the conical plate first described. By this construction of machine the preliminary cutting is most effectively produced and so that practically this preliminary work is the larger portion of the cutting. So much and such effective preliminary cutting being produced prepares the material for passing through the perforations with very little power, and as the preliminary cutting is direct the machine works extremely easy and requires but very little power for its operation when the amount of cut material is considered.

The construction is extremely simple, so easily understood as to be readily taken apart or readjusted, and because of its simplicity it is easily cleaned, and, furthermore, the effect in practical operation is to deliver substantially all the material which is introduced into the machine, the space within which the material can possibly remain being so slight as to be inconsiderable.

We claim—

1. The combination of a case provided with a hopper at one end, the opposite end open, the interior of the case constructed with spiral ribs and so as to form grooves terminating near the open end of the case, a feed-screw arranged longitudinally within the case and so as to revolve therein, the periphery of the feed-screw corresponding in shape to the ribbed interior of the case, the blades or ribs of the screw forming grooves which terminate near the end of the feed-screw, the end of the feed-screw beyond the termination of the said grooves fitting closely within the case, and a plate adapted to close the end of the case, its inner face corresponding to and so as to fit closely upon the surface of the end of the feed-screw, the plate perforated, and the screw constructed with openings from its grooves, the said openings terminating upon the inner surface of said perforated plate, substantially as described.

2. The combination of a case provided with a hopper at one end, the opposite end open, the interior of the case constructed with spiral ribs and so as to form grooves terminating near the open end of the case, a feed-screw arranged longitudinally within the case and so as to revolve therein, the periphery of the feed-screw corresponding in shape to the ribbed interior of the case, the blades or ribs of the feed-screw forming grooves which terminate near the end of the feed-screw, the end of the feed-screw beyond the termination of the said grooves fitting closely within the case, the end of the screw concentrically recessed so as to form a chamber within the screw, and the screw constructed with openings from its grooves through into said chamber, and a cup-shaped plate held stationary in the open end of the case and serving to close that end, the exterior of the cup-shaped plate corresponding to and so as to fit closely within the chamber in the end of the feed-screw, the plate constructed with perforations through its sides into its interior and so as to coact with the said openings through the feed-screw, substantially as described.

3. The combination of a case provided with a hopper at one end, the opposite end open, the interior of the case constructed with spiral ribs and so as to form grooves terminating near the open end of the case, a feed-screw arranged longitudinally within the case and so as to revolve therein, the periphery of the feed-screw corresponding in shape to the ribbed interior of the case, the blades or ribs of the screw forming grooves which terminate near the end of the feed-screw, the end of the feed-screw beyond the termination of the said grooves fitting closely within the case, and a plate adapted to close the end of the case, its inner face corresponding to and so as to fit closely upon the surface of the end of the feed-screw, the plate perforated, and the screw constructed with openings from its grooves, the said openings terminating upon the inner surface of said perforated plate, with means, substantially such as described, for adjusting the said plate with relation to the feed-screw, substantially as described.

4. The combination of a case provided with a hopper at one end, the opposite end open, the interior of the case constructed with spiral ribs and so as to form grooves terminating near the open end of the case, a feed-screw arranged longitudinally within the case and so as to revolve therein, the periphery of the feed-screw corresponding in shape to the ribbed interior of the case, the blades or ribs of the screw forming grooves which terminate near the end of the feed-screw, the end of the feed-screw beyond the termination of the said grooves fitting closely within the case, and a plate adapted to close the end of the case, its inner face corresponding to and so as to fit closely upon the surface of the end of the feed-screw, the plate perforated, and the screw constructed with openings from its grooves, the said openings terminating upon the inner surface of said perforated plate, with a bolt through the perforated plate and through the feed-screw, one end of the bolt adapted to engage the plate and the other end provided with an adjusting-nut, the bolt constructed to engage with the feed-screw and so as to partake of its revolution, whereby said plate may be longitudinally adjusted with relation to the feed-screw, substantially as described.

In testimony whereof we have signed this specification in the presence of two subscribing witnesses.

OLIVER D. WOODRUFF.
LEVI T. SNOW.

Witnesses:
FRED. C. EARLE,
LILLIAN D. KELSEY.